United States Patent [19]

Menke et al.

[11] Patent Number: 4,588,254

[45] Date of Patent: May 13, 1986

[54] METHOD EMPLOYING OPTICAL/MECHANICAL APPARATUS FOR SCANNING TWO FIELDS OF VIEW

[75] Inventors: Josef F. Menke, Glücksburg; Günter Zeifang, Neckargemünd, both of Fed. Rep. of Germany

[73] Assignee: EGO Entwicklungsgesellschaft für Optronik mbH, Glücksburg, Fed. Rep. of Germany

[21] Appl. No.: 583,252

[22] Filed: Feb. 24, 1984

[30] Foreign Application Priority Data

Mar. 3, 1983 [DE] Fed. Rep. of Germany ....... 3307484

[51] Int. Cl.⁴ .............................................. G02B 26/10
[52] U.S. Cl. ...................................... 350/6.7; 350/172
[58] Field of Search ................... 350/6.2, 6.5, 6.7, 6.4, 350/6.8, 6.9, 172, 273

[56] References Cited

U.S. PATENT DOCUMENTS 3,917,406 11/1975 Siegler, Jr. .......................... 350/172
4,527,055 7/1985 Harkless et al. ..................... 350/6.7

Primary Examiner—John K. Corbin
Assistant Examiner—Loha Ben
Attorney, Agent, or Firm—Toren, McGeady, Stanger, Goldberg & Kiel

[57] ABSTRACT

A method and apparatus for scanning two fields of view by optical/mechanical means, in two scanning directions which are disposed essentially at right-angles to one another, and for simultaneously displaying these fields of view, this method utilizing two optical/mechanical scanners, one of the scanning processes, in the line direction, being performed rapidly, and the other scanning process, in the vertical direction, being performed slowly, using only one detector or one detector array, wherein the line-scanning efficiency does not exceed 50% for both fields of view and there is a 180° phase shift between the line scanning processes respectively applied to the two fields of view.

4 Claims, 7 Drawing Figures

METHOD EMPLOYING OPTICAL/MECHANICAL APPARATUS FOR SCANNING TWO FIELDS OF VIEW

The invention relates to a method for scanning two fields of view by optical/mechanical means, and for simultaneously displaying these fields.

In the case of previously known arrangements for scanning two fields of view, the changeover is effected in a manner whereby only one field of view is scanned and displayed at any given moment.

The present invention is intended to provide a method whereby two different fields of view can be scanned and simultaneously displayed.

SUMMARY OF THE INVENTION

Briefly, the present invention may be described as a method for scanning two fields of view by optical/mechanical means, in two scanning directions which are disposed essentially at right-angles to one another, and for simultaneously displaying these two fields of view, this method utilizing two optical/mechanical scanners, one of the scanning processes, in the line direction, being performed rapidly, and the other scanning process, in the vertical direction, being performed slowly, using only one detector or one detector array, wherein the line-scanning efficiency does not exceed 50% for both fields of view and there is a 180° phase shift between the line scanning processes respectively applied to the two fields of view.

The advantage of the method according to the invention resides in the fact that possible conflicts of interest which could arise when there are two or more observers, concerning image-field selection, are avoided, since each viewer can view any desired field of view independently.

The arrangement which employs the method essentially comprises two scanning devices and a mirror-wheel or, as the case may be, a disc, which directs the radiation to the detector via an optical image-forming system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

In order the simplify the description, the detector will be regarded as an emitter, that is to say the optical path will be described in terms of radiation which leaves the detector. Although, in reality, the radiation reaches the detector from the field of view, regarding the detector as an emitter is permissible, since, in optics, optical paths are in principle reversible.

Figure 1:
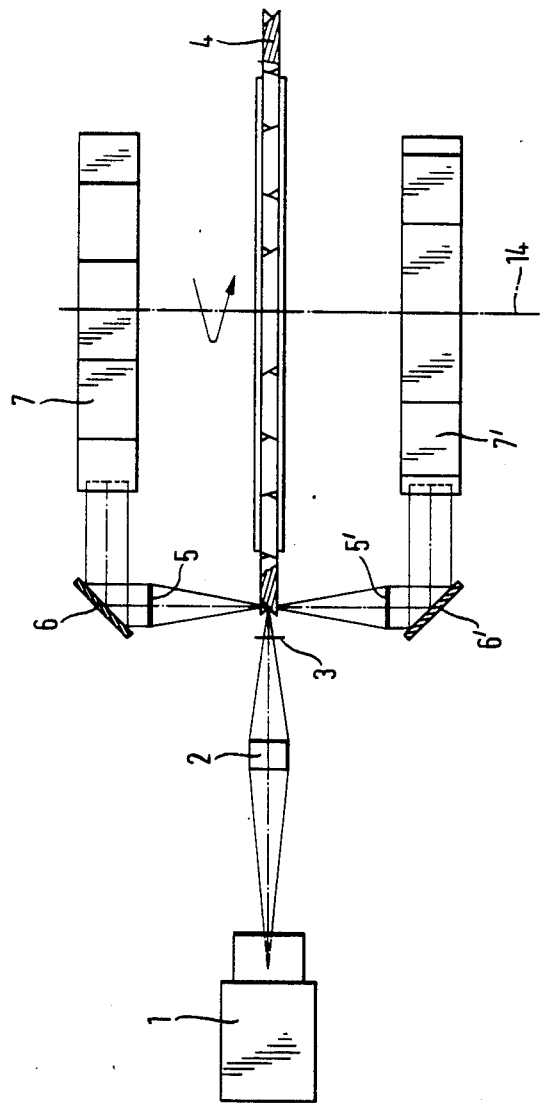
FIGS. 1–3 are schematic diagrams which show various views of an arrangement which possesses common scanning elements for the two channels.
Figure 2:
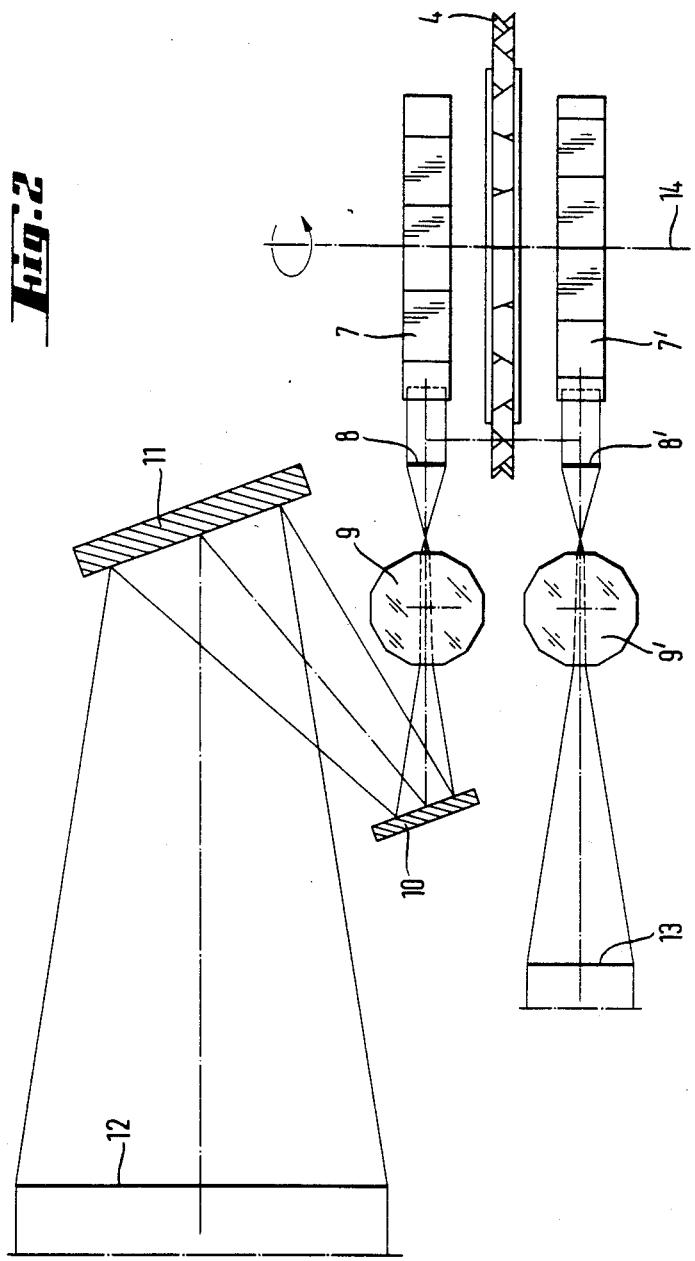
Figure 3:
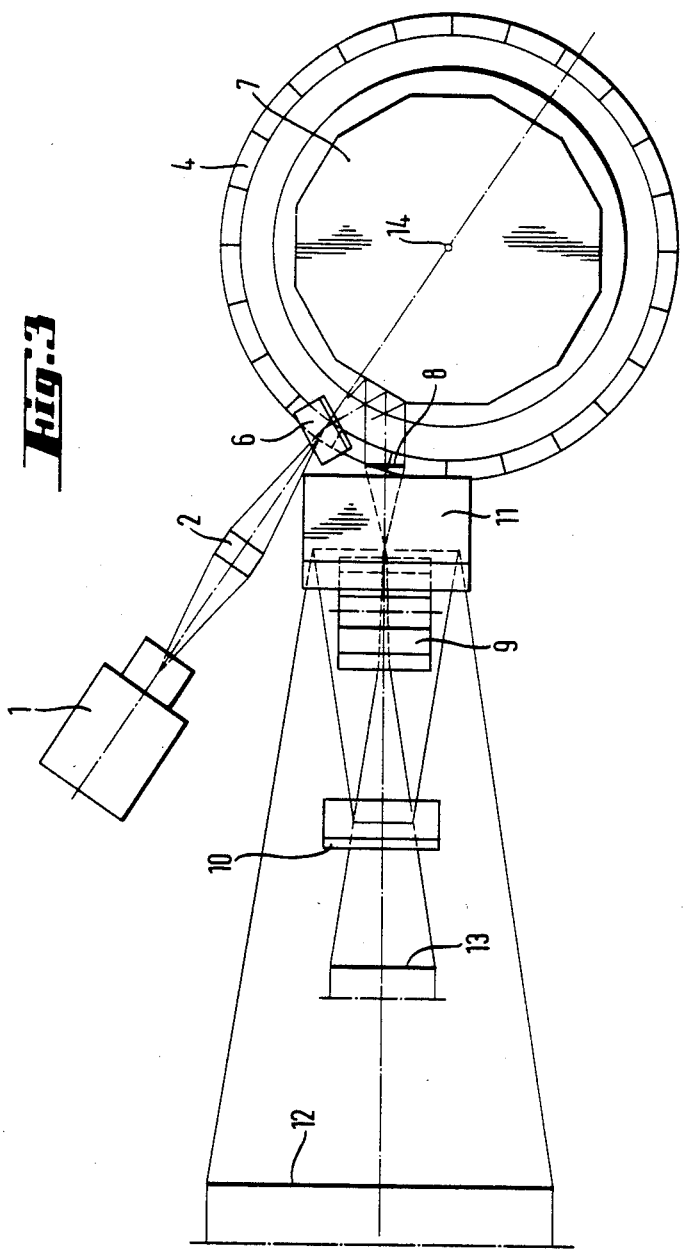

Referring to FIGS. 1–3, there is shown a detector 1 which produces, through a detector objective 2, an intermediate image on a mirror-wheel 4. A lens 3 is provided and the mirror-wheel 4 has on its periphery segments of two conical shells—arranged in alternation—with their apices located opposite one another. The number of segments of each conical shell equals the number of surfaces possessed by mirror-polygons 7, 7'. Objectives 5, 5' and path-folding mirrors 6, 6' are located in the optical path between the mirror-wheel 4 and the mirror-polygons 7, 7'.

The mirror-wheel 4 and the polygons 7, 7' rotate on a common shaft 14. The mirror-polygons, possessing n surfaces, are twisted relative to one another through 180/n degrees. The phase position of the mirror-wheel is such that a central ray leaving the detector 1 strikes the center of a surface on a polygon when it also strikes the center of the associated conical-shell segment.

While the mirror-wheel and the polygons are rotating, the rays leaving the detector are first reflected, by the mirror-wheel, onto a polygon, where they are deflected-off in the line direction. When another conical-shell segment of the mirror wheel moves into the optical path, the rays are then reflected onto the other polygon. Since an image of the detector lies on the conical-shell segments, the changeover is performed very rapidly. During the rotation, therefore, a line is scanned by one of the polygons, after which a line is scanned by the other polygon, in an alternating process. In this process, the scanning efficiency amounts, in each case, to almost 50%. The rays which are deflected by the polygons reach oculars 8, 8'. The oculars 8, 8' and objectives, 12 and 13 respectively, represent Kepler-type telescopes. Refractive polygons 9, 9' rotate slowly in the vicinity of the intermediate-image plane of the telescopes, these polygons 9, 9' performing the vertical scanning process in a known manner. Different fields of view are scanned by selecting different telescope magnifications. The path folding mirrors 10 and 11 have no functional significance.

Figure 4:
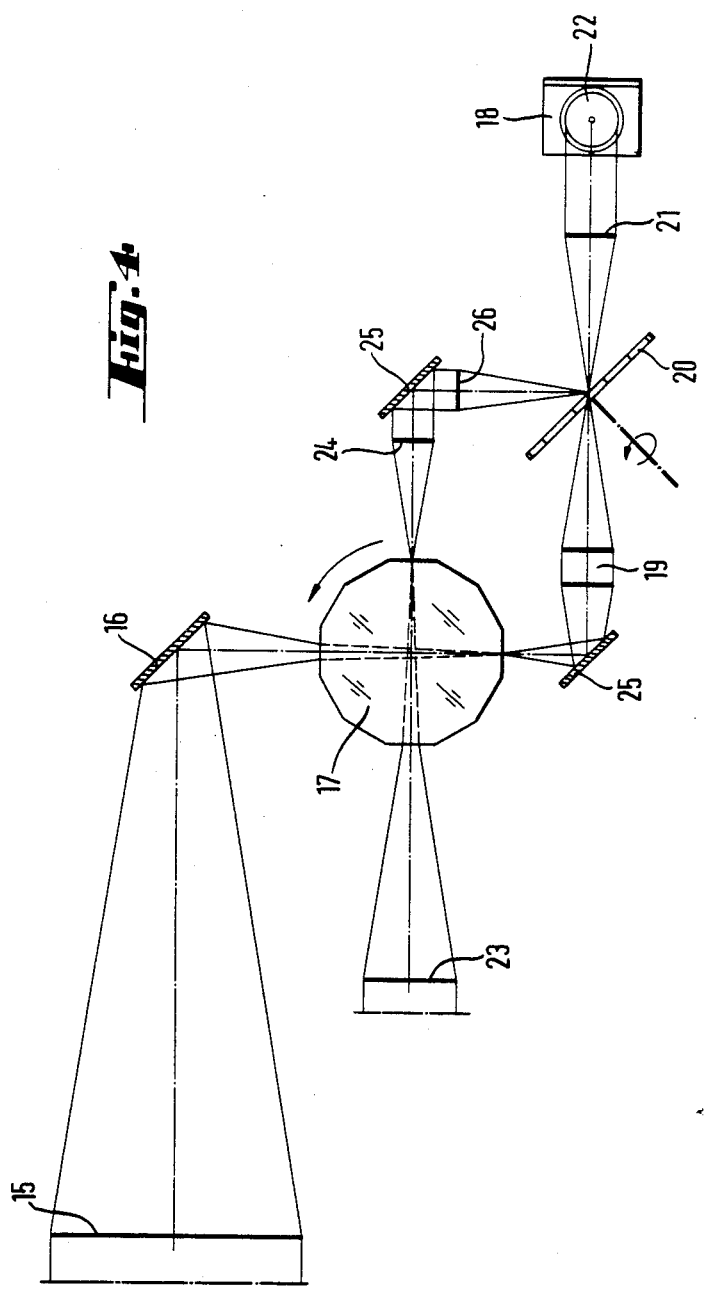
FIGS. 4 and 5 are schematic diagrams which show an illustrative embodiment of the arrangement, in which the two scanning elements are utilized for the two channels.
Figure 5:
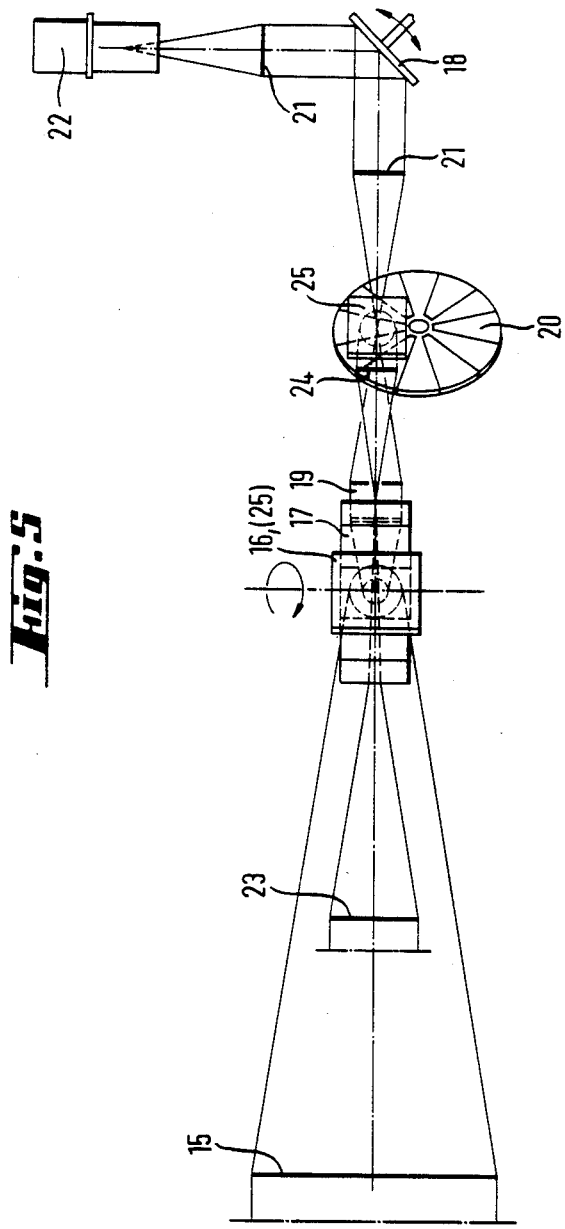

In the arrangement illustrated in FIGS. 4 and 5, the vertical scanning process, which is the slower process, is performed by means of the oscillating mirror 18 which is located in the parallel-ray portion of the optical path, between the objective elements 21. At the position occupied by the intermediate image of the detector, there rotates a disc 20 which is inclined at approximately 45°, its axis being arranged in a manner such that the intermediate image of the detector moves radially. The disc possesses reflecting segments and transparent segments, in alternation. The radiation which passes through strikes an objective 19 and a path-folding mirror 25. The reflected radiation strikes the objectives 24, 26 and the path-folding mirror 25. These objectives generate images of the detector on the periphery of the refractive polygon 17 which performs the line scanning process. It is expedient if the number of surfaces on the polygon 17 equals the number of segments on the rotating disc 20. The two elements must then rotate at the same speed, it being necessary to set the phase position in a manner such that an edge of the polygon lies on the second intermediate image of the detector when a boundary between two segments just lies on the first intermediate image of the detector. The objectives 15 and 23, which possess different focal lengths for differently-sized fields of view, form an image of the detector at infinity. A path-folding mirror is marked 16, while the detector is marked 22.

Figure 6:
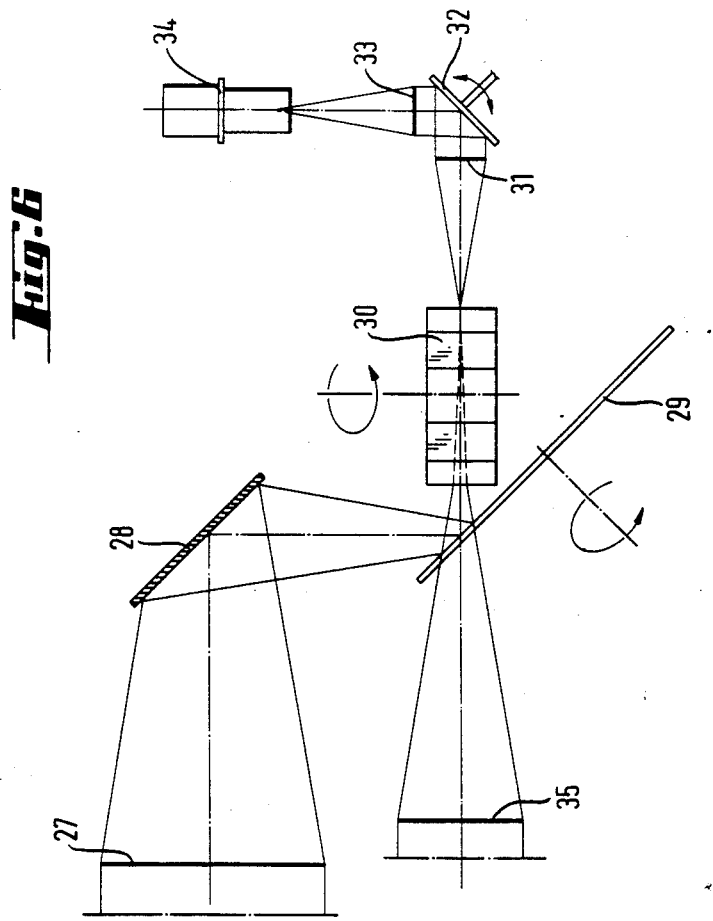
FIGS. 6 and 7 are schematic diagrams which depict a further illustrative embodiment of an arrangement possessing scanning elements which are jointly utilized.
Figure 7:
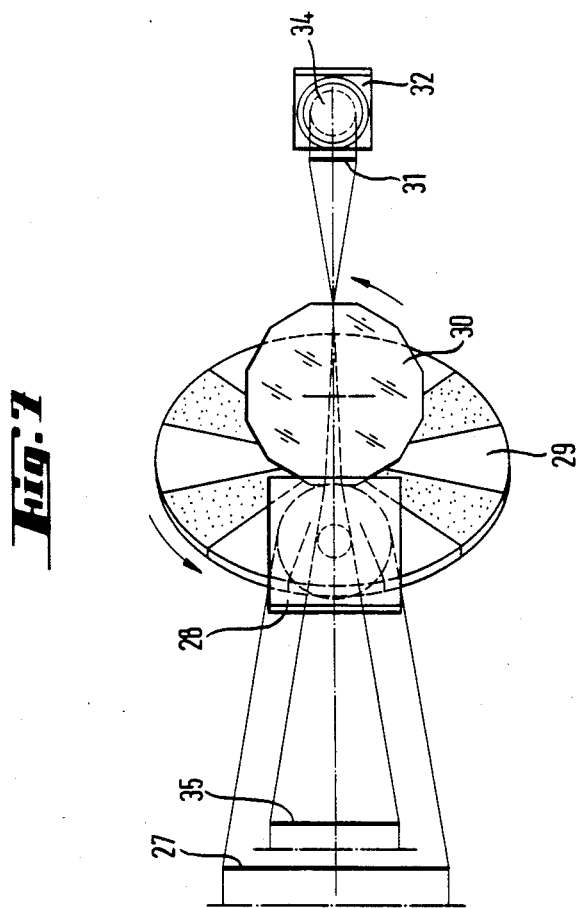

In the third illustrative embodiment, shown in FIGS. 6 and 7, the radiation leaving the detector 34 is converted, by the objective 33, into a parallel bundle. The vertical scanning process is performed by the oscillating mirror 32. The ocular 31 and the objectives 27 and 35 form Kepler-type telescopes. Once again, the line-scanning process is performed in a known manner, by means of a rotating refractive polygon 30. The changeover from one field of view to the other is effected by means of the rotating disc 29, which again possesses transparent segments and reflecting segments, in alternation. The rotation of the polygon 30 causes a parallel displacement of the bundle. The disc 29 now rotates, with the polygon 30, in a manner such that the bundle always strikes one segment during the deflection by a pair of surfaces. After one edge of the polygon has passed through the intermediate image of the detector, the scanning process is performed by the next pair of surfaces, and the radiation now strikes the next segment of the disc 29. Thus, in this case too, the different fields of view are scanned, in alternation, at a scanning efficiency which, in each case, approaches 50%. A path-folding mirror is marked 28.

It will thus be seen that the present invention provides a method for scanning two fields of view by optical/mechanical means, in two scanning directions which are disposed essentially at right-angles to one another, and for simultaneously displaying these fields of view, the method utilizing two optical/mechanical scanners, one of the scanning processes, in the line direction, being performed rapidly, and the other scanning process, in the vertical direction, being performed slowly, using only one detector or one detector array. The method of the invention is particularly characterized in that it features a line-scanning efficiency which does not exceed 50% for both fields of view, and a 180° degree phase shift between the line scanning processes which are applied to the two fields of view.

The arrangement which is utilized for the above-mentioned purpose essentially comprises two scanning devices and a mirror-wheel or, as the case may be, a disc possessing reflecting segments and transparent segments, in alternation, the radiation from the two fields of view being directed onto the detector, in each case via an optical image-forming system.

The advantage to the method according to the invention resides in the fact that possible conflicts of interest which could arise when there are two or more observers, concerning image-field selection, are avoided since each viewer can view any desired field of view independently.

While specific embodiments of the invention have been shown and described in detail to illustrate the application of the inventive principles, it will be understood that the invention may be embodied otherwise without departing from such principles.

What is claimed is:

1. In a method for scanning two fields of view by optical/mechanical means, in two scanning directions which are disposed essentially at right-angles to one another, and for simultaneously displaying these fields of view utilizing two optical/mechanical scanners, said method including one scanning process, in a line direction, being performed rapidly, and another scanning process, in a vertical direction, being performed slowly, using only one detector or one detector array, the improvement comprising that said method is performed with a line-scanning efficiency which does not exceed 50% for both fields of view and there is a 180° phase shift between said scanning processes respectively applied to the two fields of view.

2. Apparatus for scanning two fields of view by optical/mechanical means, in two scanning directions which are disposed essentially at right-angles to one another, and for simultaneously displaying these fields of view, said apparatus utilizing two optical/mechanical scanners for performing one scanning process, in a line direction, which is performed rapidly and another scanning process, in a vertical direction, which is performed slowly using only one detector or one detector array wherein said apparatus operates with a line scanning efficiency which does not exceed 50% for both fields of view and there is a 180° phase shift between said scanning processes respectively applied to the two fields of view, said apparatus comprising two pairs of scanning devices and a mirror wheel, said mirror wheel possessing segments of two conical shells arranged in alternation with apices located opposite one another and directing radiation from said two fields of view in alternation onto said detector via an optical image-forming system.

3. Apparatus for scanning two fields of view by optical/mechanical means, in two scanning directions which are disposed essentially at right-angles to one another, and for simultaneously displaying these fields of view, said apparatus utilizing two optical/mechanical scanners for performing one scanning process, in a line direction, which is performed rapidly and another scanning process, in a vertical direction, which is performed slowly using only one detector or one detector array wherein said apparatus operates with a line scanning efficiency which does not exceed 50% for both fields of view and there is a 180° phase shift between said scanning processes respectively applied to the two fields of view, said apparatus comprising: two unpaired scanning devices, a disc and a first objective, said disc possessing reflecting segments and transparent segments in alternation rotating in an intermediate image which is located in front of an image scanning device and allowing radiation from the two fields of view to reach the detector, in alternation via said first objective; a first path-folding mirror; a refractive polygon which performs said one line scanning process; a second path-folding mirror; a second objective; and a lens system.

4. Apparatus for scanning two fields of view by optical/mechanical means, in two scanning directions which are disposed essentially at right-angles to one another, and for simultaneously displaying these fields of view, said apparatus utilizing two optical/mechanical scanners for performing one scanning process, in a line direction, which is performed rapidly and another scanning process, in a vertical direction, which is performed slowly using only one detector or one detector array wherein said apparatus operates with a line scanning efficiency which does not exceed 50% for both fields of view and there is a 180° phase shift between said scanning processes respectively applied to the two fields of view, said apparatus comprising: two unpaired scanning devices, a disc and a first and a second objective, with said disc possessing reflecting segments and transparent segments in alternation rotating between said objectives; a path-folding mirror; and a refractive polygon which performs the line scanning process and which allows radiation from one or the other of the two fields of view to reach the detector in alternation.

* * * * *